United States Patent
Yamane et al.

(10) Patent No.: US 6,997,081 B2
(45) Date of Patent: Feb. 14, 2006

(54) METHOD AND STRUCTURE FOR MOUNTING A TERMINAL CONNECTOR TO A TRANSMISSION CASE

(75) Inventors: Nobufumi Yamane, Tokyo (JP); Hiroki Taniguchi, Shizuoka (JP)

(73) Assignee: Jatco LTD, Fuji (JP)

( * ) Notice: Subject to any disclaimer, the term of this patent is extended or adjusted under 35 U.S.C. 154(b) by 89 days.

(21) Appl. No.: 10/370,728

(22) Filed: Feb. 24, 2003

(65) Prior Publication Data
US 2003/0167877 A1   Sep. 11, 2003

(30) Foreign Application Priority Data
Mar. 8, 2002   (JP)   .............................. 2002-064238

(51) Int. Cl.
F16H 57/02   (2006.01)

(52) U.S. Cl. .................... 74/606 R; 439/162; 439/542
(58) Field of Classification Search ............. 74/606 R; 439/32, 34, 162, 527, 534, 542

See application file for complete search history.

(56) References Cited

U.S. PATENT DOCUMENTS

| | | | | |
|---|---|---|---|---|
| 5,361,650 A | * | 11/1994 | Klecker et al. | ........... 74/606 R |
| 6,164,160 A | * | 12/2000 | Nassar | ..................... 74/606 R |
| 6,382,180 B1 | * | 5/2002 | Wayama et al. | ............ 123/399 |
| 6,530,856 B1 | * | 3/2003 | Kakiage | .................... 475/123 |

* cited by examiner

Primary Examiner—Chong H. Kim
(74) Attorney, Agent, or Firm—Foley & Lardner LLP

(57) ABSTRACT

A method is provided to mount a terminal connector, which gathers wirings that extend from a control valve unit, to a transmission case, which includes a mount portion with a mount hole, and which encloses the control valve unit. The method includes: (a) inserting the terminal connector into the mount hole until a portion of the terminal connector projects outwardly from the mount hole, and (b) outwardly pulling the inserted terminal connector from an outside of the transmission case to thereby mount the terminal connector to the mount portion. A structure includes: (a) a connector mounting arm of the control valve unit, and (b) the terminal connector mounted into the mount hole of the mount portion. The terminal connector includes a holder portion, which is engaged with the connector mounting arm and which is slidable relative to the connector mounting arm, upon mounting the terminal connector to the mount portion.

13 Claims, 7 Drawing Sheets

METHOD AND STRUCTURE FOR MOUNTING A TERMINAL CONNECTOR TO A TRANSMISSION CASE

BACKGROUND

The present invention relates to a method and structure for mounting a terminal connector to a transmission case of an automatic transmission (AT), and more specifically to the method and structure for mounting a terminal connector which is adapted for collecting wirings extending between a control valve unit and various sensors which are used in the AT.

Generally, the AT includes a transmission section for changing rotation input transmitted from an input shaft and a control valve unit for developing and transmitting a hydraulic pressure control signal to the transmission section on the basis of a speed change control command. Recent control valve units include a plurality of electromagnetic control valves and sensors and a terminal connector for wirings which connect the electromagnetic control valves and the sensors and transmit drive currents and current signals therebetween. The terminal connector is fixed to a transmission case.

Figure 7:
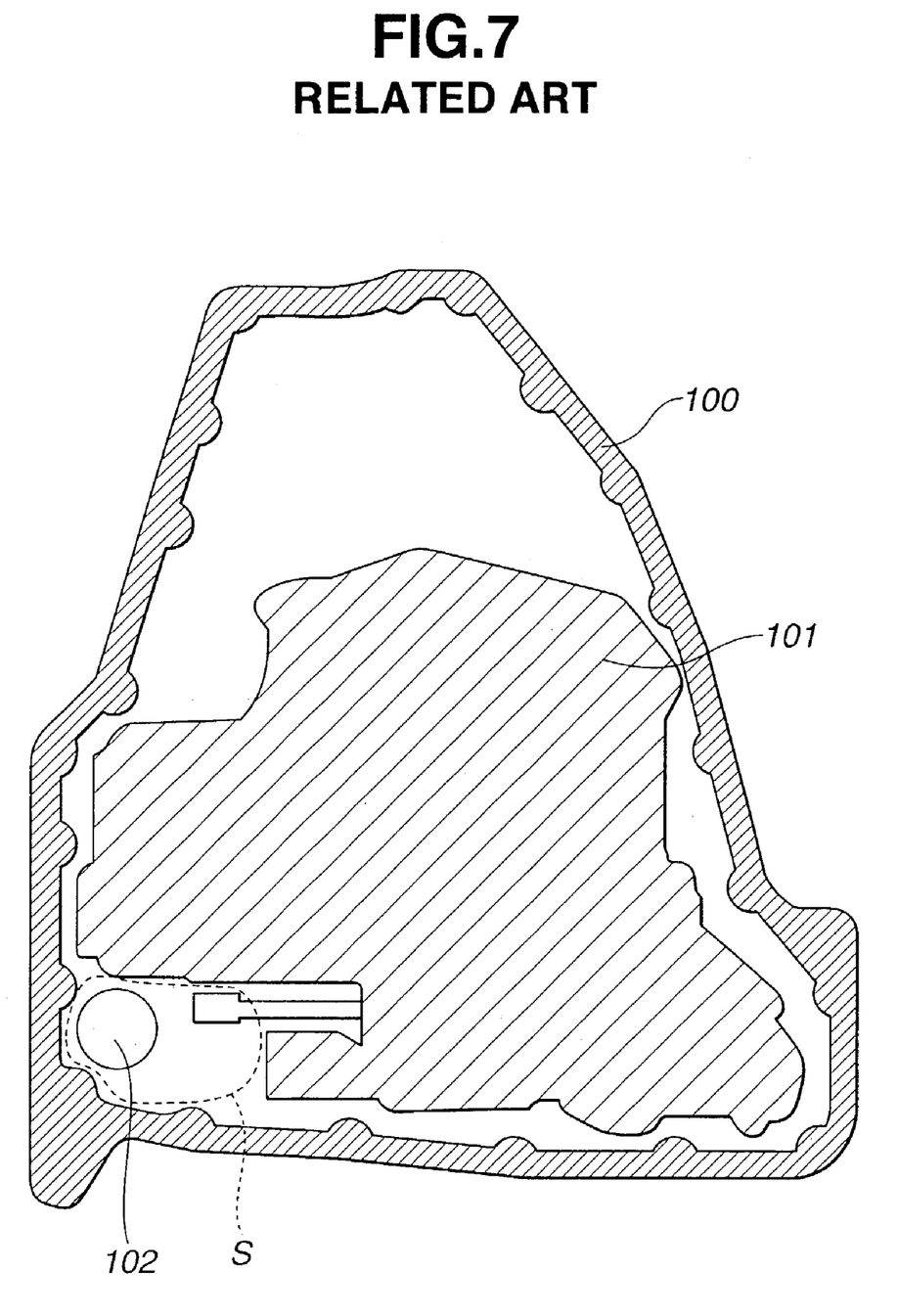
FIG. 7 is a schematic diagram, which shows mounting structure of a related art as viewed from a lower side of a transmission case.

FIG. 7 is a schematic diagram showing a terminal connector mounting structure of a related art when viewed from an underside thereof after removing an oil pan. In the structure shown in FIG. 7, reference numerals 100, 101 and 102 denote transmission case, control valve unit and terminal connector, respectively. Upon assembling control valve unit 101 to transmission case 100, wirings extending from control valve unit 101 are gathered by terminal connector 102. Then, terminal connector 102 is pushed from an inner position in transmission case 100 to an outer mount position, shown in FIG. 7, therein and secured thereto.

In the structure shown in FIG. 7, a handling space S, which is indicated by broken line of FIG. 7, must be formed to allow the operation of outwardly pushing terminal connector 102 and to mount terminal connector 102 to transmission case 100, upon assembling control valve unit 101 to transmission case 100. Therefore, the required handling space S increases a size of transmission case 100, which causes an increase in the weight and the size of transmission case 100.

SUMMARY

Figure 8:
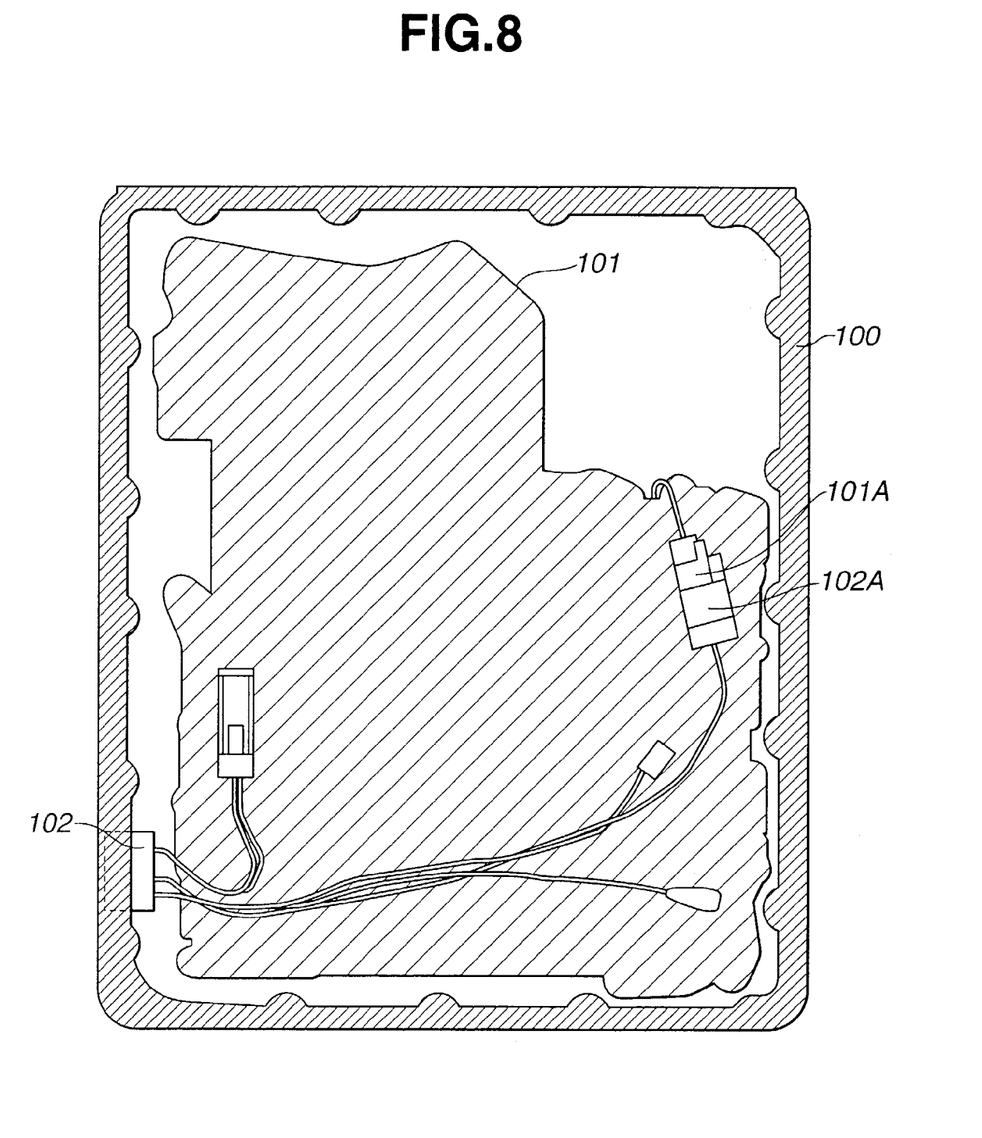
FIG. 8, which is a schematic diagram similar to FIG. 7, shows a modification of the mounting structure of FIG. 7.

FIG. 8 is a schematic diagram similar to FIG. 7, but showing a modification of the structure of FIG. 7. In FIG. 8, terminal connector 102 is mounted to transmission case 100 by inserting terminal connector 102 from the outside of transmission case 100 thereinto. In the structure shown in FIG. 8, control valve unit 101 and terminal connector 102 are arranged offset from each other in a direction perpendicular to a sheet surface of FIG. 8. This is because, if control valve unit 101 and terminal connector 102 are arranged such that lower side portions thereof are substantially flush with each other, wirings between control valve unit 101 and terminal connector 102 will be brought into contact with control valve unit 101 upon inserting terminal connector 102 into transmission case 100. In such an offset arrangement, there will occur increase in size of transmission case 100.

Further, in an offset arrangement where terminal connector 102 is disposed between control valve unit 101 and the transmission section, an operation of coupling connector 101 A of control valve unit 101 and connector 102A of terminal connector 102 as shown in FIG. 8, cannot be performed after assembling control valve unit 101 to transmission case 100. Therefore, the coupling operation must be performed before assembling control valve unit 101 to transmission case 100. This arrangement causes an excessive increase in the length of the wiring connecting connectors 101A and 102A, thereby creating various inconveniences due to the excessively increased length of the wiring.

Furthermore, electromagnetic control valves of control valve unit 101 are adapted to apply control fluid pressure to the transmission section via fluid passages. For the purpose of reducing the number of the fluid passages, it is required to arrange the electromagnetic control valves within control valve unit 101 at a position closer to the corresponding fluid passages of the transmission section. However, in a case where terminal connector 102 is arranged on the side of an oil pan in offset relation to control valve unit 101, the electromagnetic control valves and sensors of control valve unit 101 must be disposed on the side of the oil pan to reduce a length of the wiring connecting the respective connectors of control valve unit 101 and terminal connector 102. This will cause an increase in the number of the fluid passages connecting the electromagnetic control valves with the transmission section, thereby inhibiting the ability to arrange the fluid passages.

It would, therefore, be desirable to provide a method and structure for mounting a terminal connector to a transmission case of an automatic transmission (AT), which is capable of providing efficient wiring and which serves to reduce the size and weight of the AT.

In one aspect of the present invention, there is provided a method of mounting a terminal connector to a transmission case, the transmission case including a mount portion with a mount hole, the transmission case enclosing a control valve unit, the terminal connector gathering a plurality of wirings extending from the control valve unit. Among other steps, this method includes: inserting the terminal connector into the mount hole of the mount portion until a portion of the terminal connector projects outward from the mount hole; and pulling the inserted terminal connector from an outside of the transmission case outward to thereby mount the terminal connector to the mount portion of the transmission case.

In a further aspect of the present invention, there is provided a structure. This structure includes, among other possible things: a transmission case including a mount portion defining a mount hole; a control valve unit within the transmission case, the control valve unit including a connector mounting arm; and a terminal connector mounted into the mount hole of the mount portion, the terminal connector including a holder portion engaged with the connector mounting arm, the holder portion being slidable relative to the connector mounting arm upon mounting the terminal connector to the mount portion of the transmission case.

DETAILED DESCRIPTION

Figure 1:
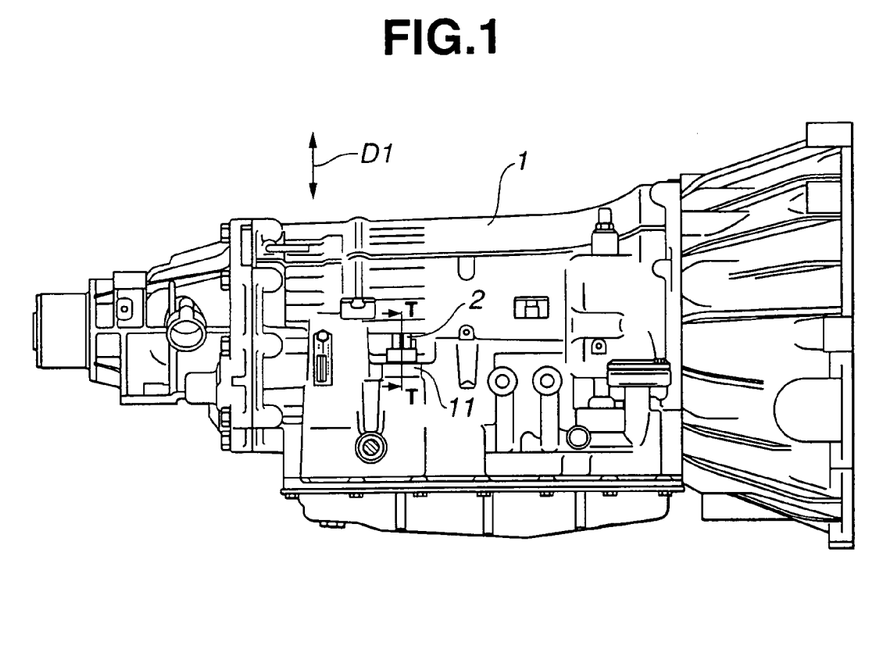
FIG. 1 which is a side view of a transmission case of an automatic transmission, shows a terminal connector mounting structure in which a terminal connector is mounted to the transmission case, according to an embodiment of the present invention.
Figure 2:
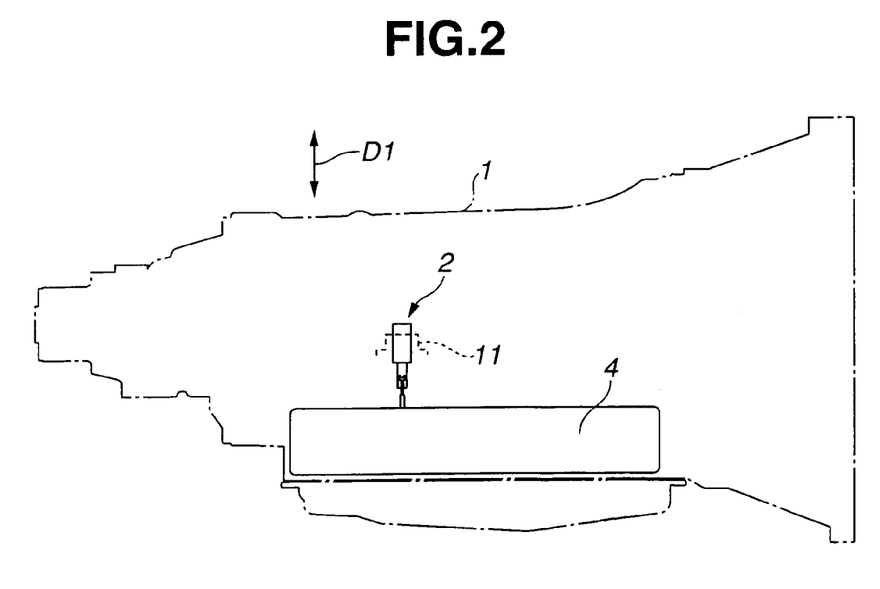
FIG. 2 is a schematic diagram showing an arrangement of the terminal connector and a control valve unit relative to the transmission case.

With respect to FIGS. 1 and 2, there is shown a structure for mounting a terminal connector to a transmission case of an automatic transmission (AT), according to an embodiment of the present invention. As illustrated in FIGS. 1 and 2, transmission case 1 includes mount portion 11 for terminal connector 2. Mount portion 11 is disposed on a side wall of transmission case 1 and extends in vertical direction D1 of transmission case 1, namely, in a direction substantially perpendicular to an imaginary bottom face of transmission case 1. Mount portion 11 has mount hole 11A shown in FIGS. 4A and 4B into which terminal connector 2 is mounted. Mount hole 11A has a generally cylindrical shape. An outer periphery of mount portion 11 defines an outlet of mount hole 11A from which connector portion 21 of terminal connector 2 outwardly projects. The outer periphery of mount portion 11 is disposed substantially perpendicular to a center axis of mount hole 11A. As illustrated in FIG. 2, control valve unit 4 is disposed within a lower end portion of transmission case 1. Control valve unit 4 and terminal connector 2 are designed as a unitary module.

Figure 3A:
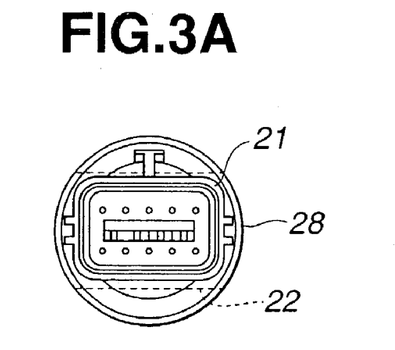
FIG. 3A is a top plan view of the terminal connector.
Figure 3B:
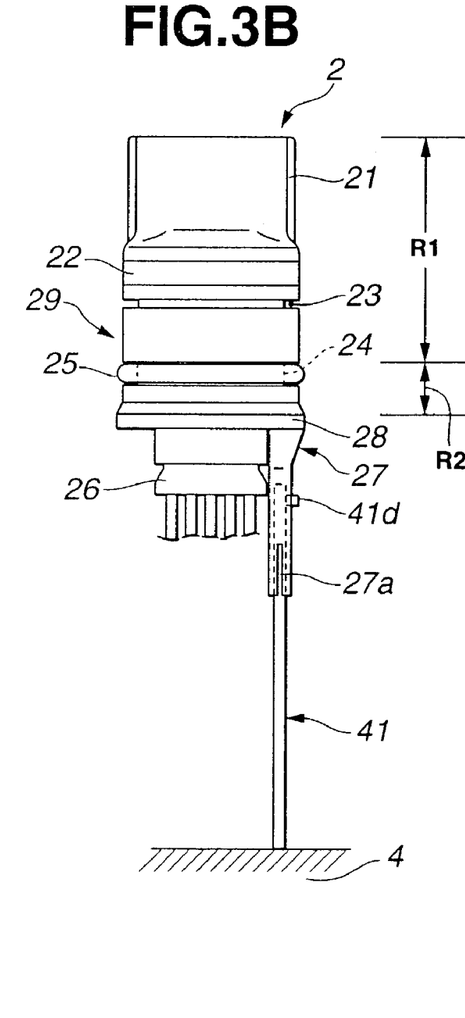
FIG. 3B is an enlarged front view of the terminal connector shown in FIG. 3A.
Figure 3C:
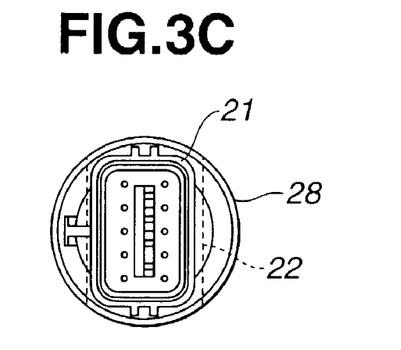
FIG. 3C, which is a view similar to FIG. 3A, shows the terminal connector when the terminal connector is turned about the center axis at substantially a right angle.
Figure 3D:
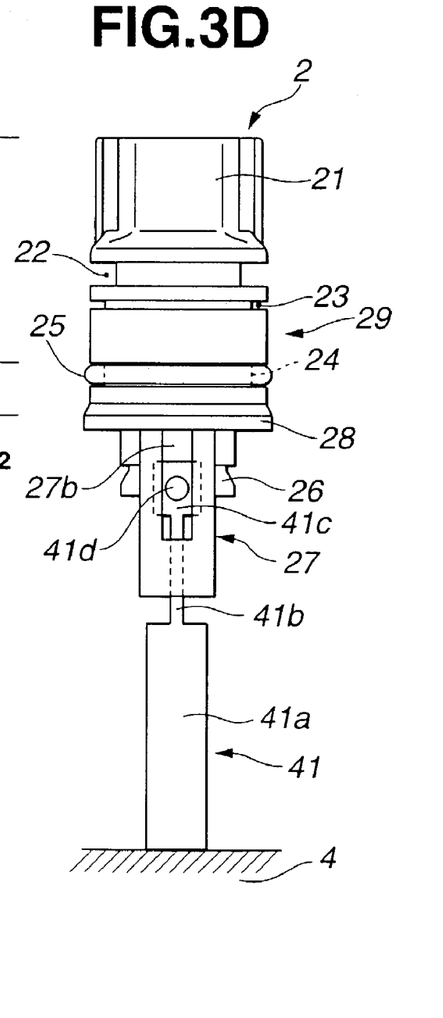
FIG. 3D is an enlarged side view of the terminal connector shown in FIG. 3C.

With respect to FIGS. 3A–3D, terminal connector 2 is explained. Terminal connector 2 includes generally cylindrical body portion 29 and connector portion 21 connected with body portion 29. Body portion 29 is adapted to be disposed within mount hole 11A of mount portion 11. Connector portion 21 is disposed at an axial end, namely, an upper end as shown in FIGS. 3B and 3D, of body portion 29. Connector portion 21 is adapted to project from mount hole 11A to connect with an external connection terminal. Body portion 29 has engaging grooves 22, check groove 23 and seal groove 24 on an outer circumferential surface thereof. These grooves 22, 23 and 24 are spaced from each other in an axial direction of body portion 29. Engaging grooves 22 which are engageable with tool 7 as explained later, are formed parallel to each other on the outer circumferential surface of body portion 29. Engaging grooves 22 extend parallel to an imaginary plane substantially perpendicular to the axial direction of body portion 29. The axial direction of body portion 29 is hereinafter referred to as an axial direction of terminal connector 2. Check groove 23 extends in the circumferential direction of body portion 29. Check groove 23 is formed to determine a sealing position where mount portion 11 is sealed by an O-ring seal 25, which is press-fitted to mount hole 11A upon mounting terminal connector 2 to mount portion 11 as explained later. O-ring seal 25 is fitted into seal groove 24 formed along the entire outer circumferential surface of body portion 29. A stop 28 is disposed at an opposite axial end, namely, a lower end as shown in FIGS. 3B and 3D, of body portion 29. A connection terminal 26 and a holder portion 27 are disposed on a lower side of stop 28. Connection terminal 26 is connected with an actuator disposed on the side of control valve unit 4. Holder portion 27, which is formed into a generally rectangular hollow box shape that has an open end, extends along the axial direction of terminal connector 2. Holder portion 27 has a slit 27a in a front wall thereof and an opening 27b in one side wall thereof as shown in FIGS. 3B and 3D, respectively. Slit 27a extends along the axial direction of terminal connector 2 and allows a connector mounting arm 41 to be inserted into holder portion 27, upon coupling holder portion 27 with connector mounting arm 41. Engaging opening 27b extends along the axial direction of terminal connector 2 and is engaged with an engaging projection 41d of connector mounting arm 41, as shown in FIGS. 3B and 3D. Engaging opening 27b allows holder portion 27 to slide relative to connector mounting arm 41 with engaging projection 41d in the axial direction. Terminal connector 2 includes: (a) a first region R1 for an inserting operation of terminal connector 2 into mount hole 11A, upon mounting terminal connector 2 to transmission case 1, and (b) a second region R2 for pulling terminal connector 2 subsequent to the inserting operation. First region R1 axially extends from a distal end of connector portion 21 to a portion of O-ring seal 25, which comes into contact with a periphery of an inlet of mount hole 11A upon inserting terminal connector 2. Second region R2 axially extends from the portion of O-ring seal 25 to an upper end of stop 28, namely, to the lower end of body portion 29. Second region R2 is designed to extend at an axial distance smaller than engaging opening 27b.

Connector mounting arm 41 is fixedly supported on control valve unit 4. Connector mounting arm 41 is engaged with holder portion 27 of terminal connector 2. Connector mounting arm 41 includes: (a) a support portion 41a that is secured to control valve unit 4, (b) a fall-down preventing portion 41c that is received in holder portion 27, and (c) a slide portion 41b that is disposed between support portion 41a and fall-down preventing portion 41c. As illustrated in FIG. 3D, slide portion 41b: (a) has a width that is smaller than that of support portion 41a and (b) is slidably moved into holder portion 27. Fall-down preventing portion 41c has a width that is larger than that of engaging opening 27b of holder portion 27 as shown in FIG. 3D. Fall-down preventing portion 41c abuts on a peripheral portion surrounding engaging opening 27b of holder portion 27 to thereby be prevented from projecting from engaging opening 27b and falling down rightward in FIG. 3B. Engaging projection 41d, which is formed on fall-down preventing portion 41c outwardly extends through engaging opening 27b. Holder portion 27 can be prevented from being disengaged from connector mounting arm 41 by abutment of engaging projection 41d on a lower end periphery of engaging opening 27b.

Upon coupling terminal connector 2 to connector mounting ann 41 of control valve unit 4, engaging projection 41d is inserted from the open end of holder portion 27 into the inside space by completely expanding slit 27a of holder portion 27. Fall-down preventing portion 41c with engaging projection 41d is further moved inside until engaging projection 41d is engaged in engaging opening 27b. Connector mounting arm 41 and terminal connector 2 are thus coupled with each other and form a unitary module. Owing to the coupling of connector mounting arm 41 and terminal connector 2, terminal connector 2 can slidably move relative to connector mounting arm 41 in the axial direction and can pivot about engaging projection 41d until the open end of holder portion 27 is contacted with a front surface of slide portion 41b. The axially sliding movement of terminal connector 2 is limited within a range equivalent to a length of engaging opening 27b of holder portion 27.

Figure 4A:
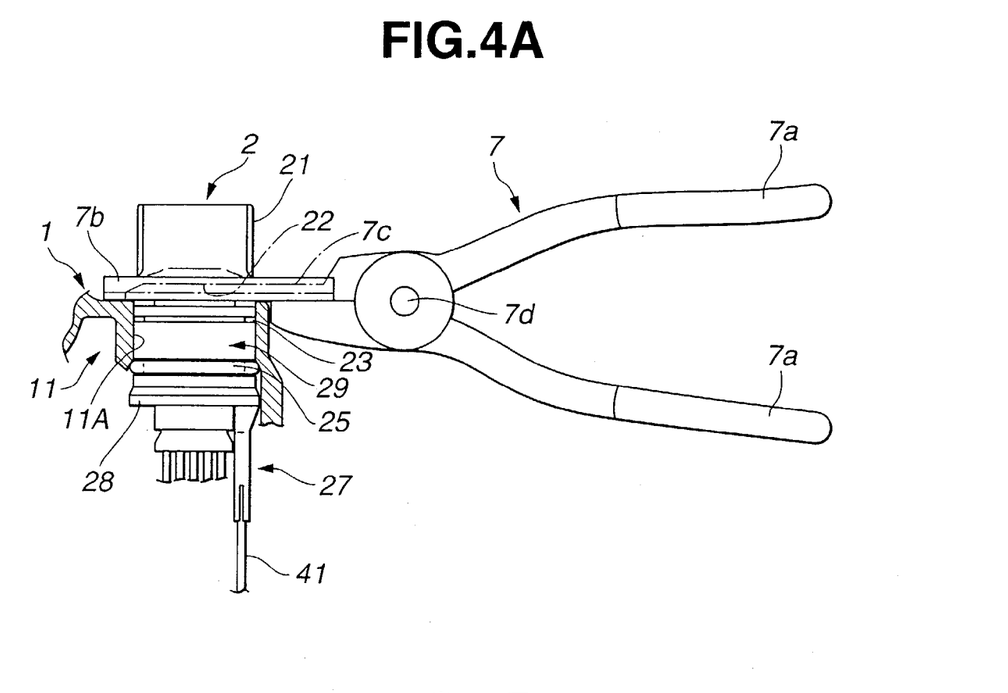
FIGS. 4A and 4B are schematic diagrams that illustrate an operation of mounting the control valve unit to the transmission case.
Figure 4B:
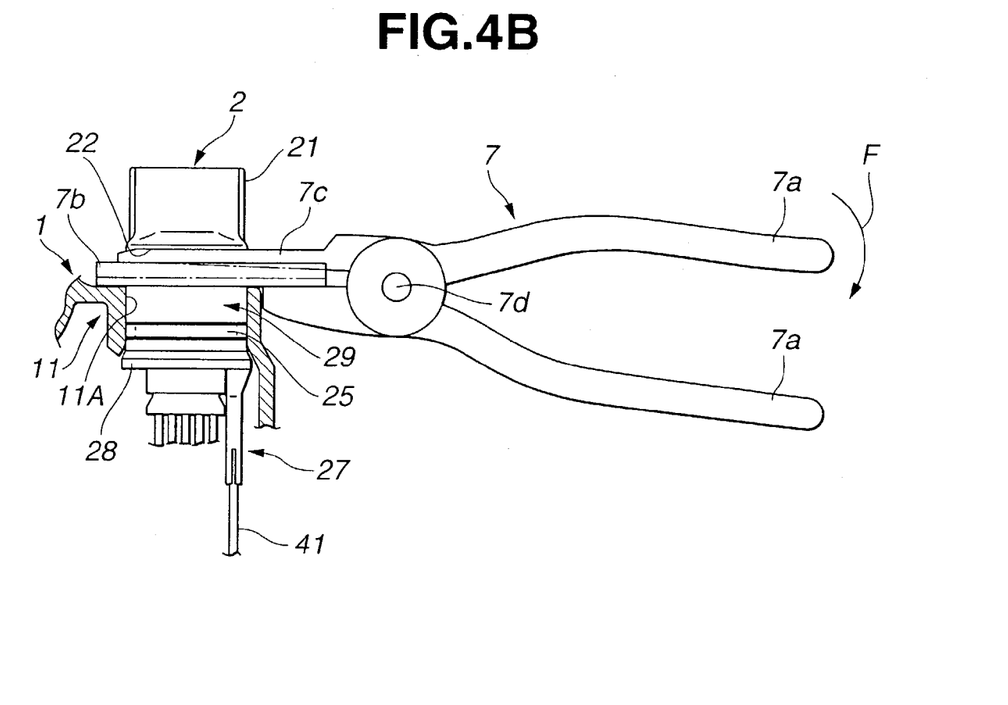

With respect to FIGS. 4A–4B, a method of mounting the unitary module of control valve unit 4 and terminal connector 2 to transmission case 1 will be explained. FIGS. 4A and 4B illustrate a section of mount portion 11 of transmission case 1, taken along line T—T of FIG. 1. First, the unitary module of control valve unit 4 and terminal connector 2 is moved into a lower portion of transmission case 1 through a bottom opening of transmission case 1. As illustrated in FIG. 4A, connector portion 21 of terminal connector 2 is inserted into mount hole 11A of mount portion 11 until connector portion 21 outwardly projects from mount hole 11A and an outer periphery of O-ring seal 25 is contacted with an inner periphery of mount portion 11. The inner periphery of mount portion 11 defines the inlet of mount hole 11A from which terminal connector 2 is inserted into mount hole 11A. First region R1 of terminal connector 2 is inserted into mount hole 11A during the inserting operation. At this state, control valve unit 4 is secured to transmission case 1 by means of bolts. Next, a lift portion 7c of tool 7 is placed into engaging grooves 22 of body portion 29 of terminal connector 2. Here, tool 7 is explained.

Figure 5A:
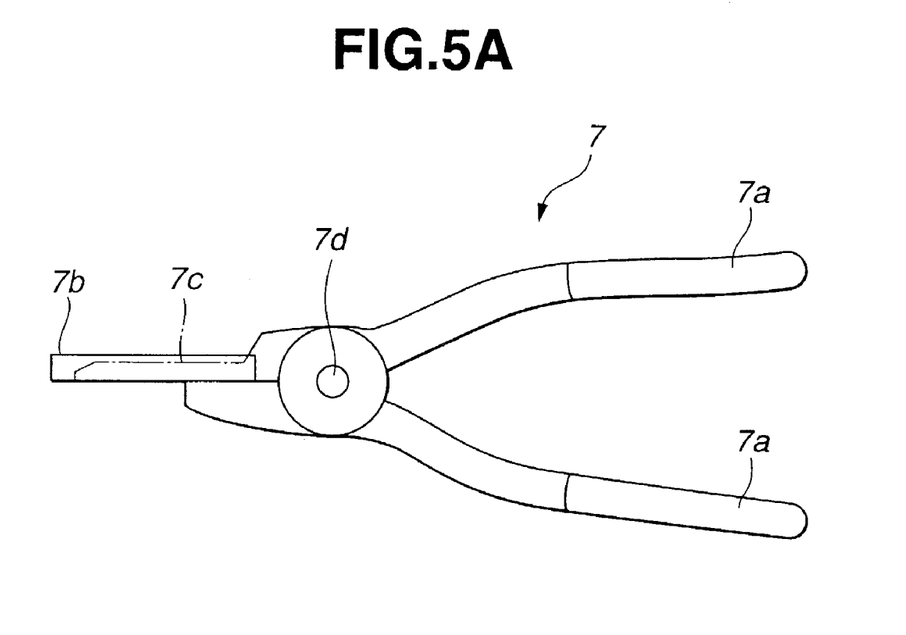
FIGS. 5A and 5B are side and top plan views, respectively, of a jig or tool used in the embodiment shown in FIGS. 1–4B.
Figure 5B:
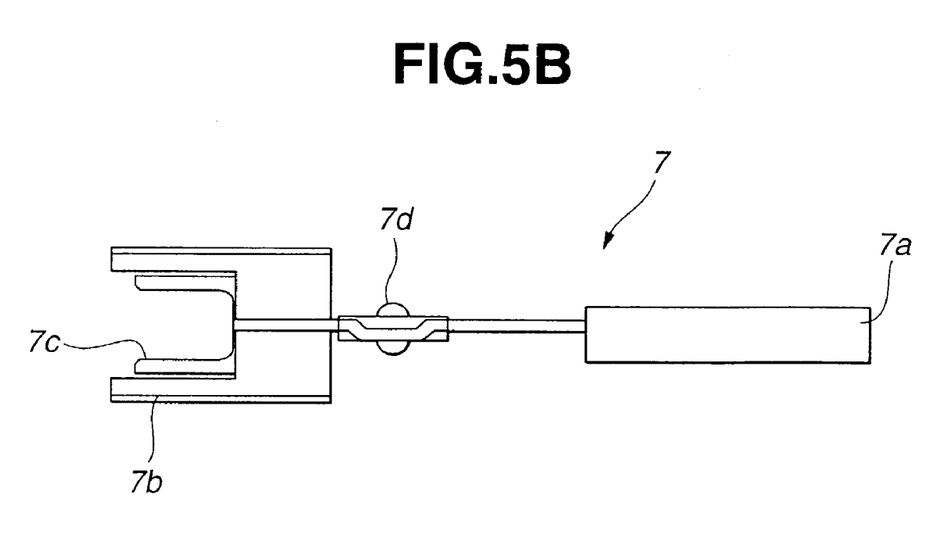

FIGS. 5A and 5B illustrate tool 7 used in the mounting operation of terminal connector 2. Tool 7 includes: (a) two grip portions 7a to be held by an operator, (b) a bearing portion 7b to be urged against the outer periphery of mount portion 11, and (c) the lift portion 7c for lifting body portion 29 of terminal connector 2. One of the grip portions 7a is connected with bearing portion 7b, whereas the other is connected with lift portion 7c. Grip portions 7a are joined together by pivot 7d so as to be rotatively moveable about pivot 7d. Bearing portion 7b has a generally U-shape as shown in FIG. 5B. Lift portion 7c, which has a generally U-shape that is smaller in size than bearing portion 7b, is disposed inside bearing portion 7b as shown in FIG. 5B. Lift portion 7c is formed to be engageable in engaging grooves 22 of body portion 29 of terminal connector 2. Bearing portion 7b and lift portion 7c are moveable to separate from each other by actuating grip portions 7a.

With respect once again to FIG. 4B, there is shown an operation subsequent to insertion of first region R1 of terminal connector 2 into mount hole 11A and fitting lift portion 7c of tool 7 into engaging grooves 22. When the operator actuates grip portions 7a as indicated by arrow F in FIG. 4B, bearing portion 7b is urged against the outer periphery of mount portion 11 of transmission case 1 to thereby cause a reaction force that is applied to lift portion 7c. Lift portion 7c, which is engaged in grooves 22, is forced to move upwardly and lift terminal connector 2. O-ring seal 25 mounted on body portion 29 of terminal connector 2 is press-fitted into mount hole 11A and moved to the sealing position where the sealing of mount portion 11 is ensured. Upon lifting terminal connector 2, stop 28 comes into engagement with the inner periphery of mount portion 11 and prevents excessive upward lifting of terminal connector 2. At this state, the operator can visually check whether or not check groove 23 of body portion 29 is seen. If check groove 23 is seen, it can be recognized that O-ring seal 25 is placed in the sealing position in mount hole 11A and that the press-fitting operation of O-ring seal 25 is completed. Tool 7 then is taken off terminal connector 2.

Figure 6:
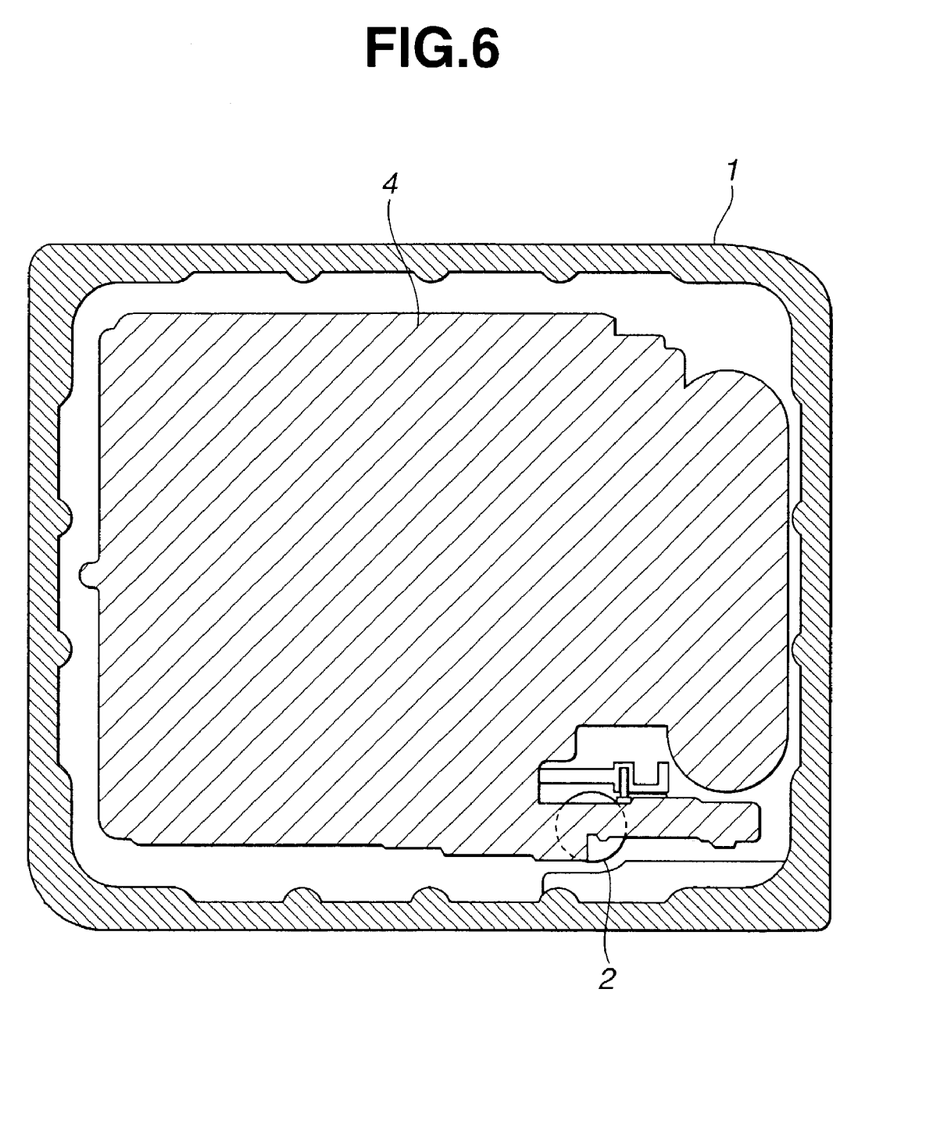
FIG. 6 is a schematic diagram of the mounting structure as viewed from a lower side of the transmission case.

FIG. 6 shows the mounting state in which the unitary module of terminal connector 2 and control valve unit 4 is mounted to transmission case 1, as viewed from the underside of transmission case 1. As illustrated in FIG. 6, terminal connector 2 is disposed over control valve unit 4 in the direction perpendicular to the sheet surface of FIG. 6, namely, in vertical direction D1 of transmission case 1 as shown in FIGS. 1 and 2. With the terminal connector mounting structure, handling space S, shown in FIG. 7, as required in the terminal connector mounting structure of the related art can be omitted. This reduces both the size and weight of the A/T.

As previously explained the terminal connector mounting method and structure of the present invention can omit the handling space for outward pushing a terminal connector to the mount position in a transmission case. Further, in the terminal connector mounting method and structure of the present invention, it is not required to connect the actuators of control valve unit 4 with terminal connector 2 after assembling control valve unit 4 to transmission case 1 as explained in the case shown in FIG. 8. Further, terminal connector 2 and control valve unit 4 do not require the corresponding connectors for coupling therebetween which are indicated at 101A and 102A in FIG. 8. Furthermore, in the terminal connector mounting method and structure of the present invention, a length of the wiring between terminal connector 2 and control valve unit 4 can be remarkably reduced, thereby preventing the wiring from being urged onto the transmission section and saving the production cost.

Further, upon mounting terminal connector 2 to transmission case 1, the positioning of terminal connector 2 relative to transmission case 1 can be readily performed merely inserting connector portion 21 of terminal connector 2 into mount hole 11A of mount portion 11 of transmission case 1 over first region R1. In the subsequent operation of upward pulling terminal connector 2 with tool 7 over second region R2, stress applied to O-ring seal 25 can be balanced as compared to a manual pulling operation. This can prevent O-ring seal 25 from being damaged due to unbalance stress, which may otherwise be applied to O-ring seal 25 if terminal connector 2 is upwardly pulled after inserting connector portion 21 in a tilting state into mount hole 11A. O-ring seal 25, therefore, can be moved to the sealing position in mount hole 11A in which O-ring seal 25 can prevent leakage of an oil from mount portion 11. Further, a stable insertion angle of terminal connector 2 can be obtained, whereby it is unnecessary to ensure a length of mount hole 11A, which is required for limiting the insertion angle. As a result, the amount of material of transmission case 1 can be reduced and, therefore, the weight of transmission case 1 can be decreased.

Further, with the provision of holder portion 27 on terminal connector 2 and connector mounting arm 41 on control valve unit 4, terminal connector 2 and control valve unit 4 can be formed as a unitary module. This serves for simultaneously performing: (a) the mounting operation of terminal connector 2 to mount portion 11 of transmission case 1 and (b) the assembling operation of control valve unit 4 to transmission case 1. Further, as holder portion 27 can slide on connector mounting arm 41, the mounting operation of terminal connector 2 to mount portion 11 can be completed by upwardly pulling terminal connector 2 with tool 7 after assembling control valve unit 4 to transmission case 1.

This serves to improve the mountability of the terminal connector mounting structure.

Furthermore, engaging projection 41d of connector mounting arm 41 can be kept in engagement with engaging opening 27b of holder portion 27 to thereby maintain the coupling of connector mounting arm 41 and holder portion after terminal connector 2 is mounted to mount portion 11. Therefore, even when the AT is disassembled, for instance, for the purpose of operational maintenance, the unitary module of terminal connector 2 and control valve unit 4 may not be disassembled. This serves to enhance the efficiency of the disassembling work.

Further, as slide portion 41b of connector mounting arm 41 is formed into the small width as shown in FIG. 3D, holder portion 27 can slide relative to connector mounting arm 41 in not only the direction of the terminal connector pulling operation but a direction other than the direction of the terminal connector pulling operation. Namely, holder portion 27 can pivotally move about engaging projection 41d while keeping the sliding engagement with connector mounting arm 41. This allows appropriate positioning of terminal connector 2 relative to mount portion 11 of transmission case 1 even if (a) is production error of transmission case 1 and/or control valve unit 4 or (b) an error occurs in assembling control valve unit 4 to transmission case 1. This enhances the mountability of the terminal connector mounting structure.

Further, engaging grooves 22 are formed parallel to the imaginary plane substantially perpendicular to the axial direction of body portion 29 of terminal connector 2. Namely, engaging grooves 22 are substantially perpendicular to the direction of the terminal connector pulling operation in which terminal connector 2 is upwardly pulled upon being mounted to mount portion 11. Upon applying a force to the outer periphery of mount portion 11 of transmission case 1 via grip portion 7a of tool 7, a reaction force is applied to lift portion 7c, is engaged with engaging grooves 22, to thereby upwardly pull terminal connector 2. Thus, the positioning of tool 7 can be readily accomplished by the provision of engaging grooves 22. This serves to reduce the operational labor required to upwardly pull terminal connector 2. Furthermore, as the balanced pulling force can be applied to terminal connector 2 through the engagement of lift portion 7c of tool 7 with engaging grooves 22, the stress exerted on O-ring seal 25 can be also balanced.

Further, with the provision of check groove 23 on terminal connector 2, the operator can visually check completion of the operation of mounting terminal connector 2 to mount portion 11. Operational labor, therefore, can be reduced.

Further, with the provision of stop 28 on terminal connector 2, terminal connector 2 can be prevented from being excessively pulled upward. This reduces operational labor.

This application is based on prior Japanese Patent Application No. 2002-064238 filed on Mar. 8, 2002, the entire content of which is hereby incorporated by reference.

Although the invention has been described above by reference to a certain embodiment of the invention, the invention is not limited to the embodiment described above. Modifications and variations of the embodiment described above will occur to those skilled in the art in light of the above teachings. The scope of the invention is defined with reference to the following claims.

What is claimed is:

1. A structure comprising:
   a transmission case including a mount portion defining a mount hole;
   a control valve unit within the transmission case, the control valve unit including a connector mounting arm; and
   a terminal connector mounted into the mount hole of the mount portion, the terminal connector including a holder portion electrically engaged with the connector mounting arm, the holder portion being configured to slide relative to the connector mounting arm after mounting the terminal connector to the mount portion of the transmission case, while maintaining the electrical connection of the holder portion and the connector mounting arm.

2. The structure as claimed in claim 1, wherein the terminal connector comprises an O-ring seal on an outer circumferential surface thereof.

3. The structure as claimed in claim 1, wherein the engagement between the holder portion and the connector mounting arm is maintained after mounting the terminal connector to the mount portion of the transmission case.

4. The structure as claimed in claim 1, wherein the holder portion is moveable relative to the connector mounting arm in a direction of sliding movement in which the terminal connector is pulled, as well as in a direction other than the direction of sliding movement.

5. The structure as claimed in claim 2, wherein the terminal connector further comprises a cylindrical body portion and parallel grooves extending on an outer circumferential surface of the body portion, the parallel grooves being formed parallel to an imaginary plane substantially perpendicular to a direction of inserting the terminal connector into the mount hole.

6. A structure comprising:
   a transmission case including a mount portion defining a mount hole;
   a control valve unit within the transmission case, the control valve unit including a connector mounting arm; and
   a terminal connector mounted into the mount hole of the mount portion, the terminal connector including a holder portion engaged with the connector mounting arm, the holder portion being slidable relative to the connector mounting arm upon mounting the terminal connector to the mount portion of the transmission case, the terminal connector comprising:
      an O-ring seal on an outer circumferential surface thereof;
      a cylindrical body portion; and
      parallel grooves extending on an outer circumferential surface of the body portion,
   wherein the parallel grooves are formed parallel to an imaginary plane substantially perpendicular to a direction of inserting the terminal connector into the mount hole, and
   wherein the body portion includes a check groove extending on the entire outer circumferential surface thereof, the check groove being formed to determine a sealing position where the mount portion is sealed.

7. The structure as claimed in claim 5, wherein the body portion includes a seal groove formed on the outer circumferential surface thereof into which the O-ring seal is fitted.

8. A structure comprising:
   a transmission case including a mount portion defining a mount hole;
   a control valve unit within the transmission case, the control valve unit including a connector mounting arm; and a terminal connector mounted into the mount hole of the mount portion, the terminal connector including a holder portion engaged with the connector mounting arm, the holder portion being slidable relative to the connector mounting arm upon mounting the terminal connector to the mount portion of the transmission case, the terminal connector comprising:
  an O-ring seal on an outer circumferential surface thereof;
  a cylindrical body portion; and
  parallel grooves extending on an outer circumferential surface of the body portion,
  wherein the parallel grooves are formed parallel to an imaginary plane substantially perpendicular to a direction of inserting the terminal connector into the mount hole, and
  wherein the terminal connector comprises a stop preventing excessive insertion of the terminal connector into the mount hole, the stop being disposed between the body portion and the holder portion.

9. The structure as claimed in claim 8, wherein the holder portion is slidable in a range larger than an axial length extending between the O-ring seal and the stop.

10. The structure as claimed in claim 5, wherein the holder portion is slidable in an axial direction of the body portion.

11. The structure as claimed in claim 5, wherein the holder portion comprises an engaging opening extending along an axial direction of the body portion, the connector mounting arm comprising an engaging projection engaged in the engaging opening.

12. A structure comprising:
  a transmission case including a mount portion defining a mount hole;
  a control valve unit within the transmission case, the control valve unit including a connector mounting arm; and
  a terminal connector mounted into the mount hole of the mount portion, the terminal connector including a holder portion engaged with the connector mounting arm, the holder portion being slidable relative to the connector mounting arm upon mounting the terminal connector to the mount portion of the transmission case, the terminal connector comprising:
    an O-ring seal on an outer circumferential surface thereof;
    a cylindrical body portion; and
    parallel grooves extending on an outer circumferential surface of the body portion,
    wherein the parallel grooves are formed parallel to an imaginary plane substantially perpendicular to a direction of inserting the terminal connector into the mount hole, and
    wherein the holder portion comprises:
      an engaging opening extending along an axial direction of the body portion, wherein the connector mounting arm comprises an engaging projection engaged in the engaging opening; and
      a slit extending along the axial direction of the body portion, wherein the slit allows the connector mounting arm with the engaging projection to be inserted into the holder portion.

13. The structure as claimed in claim 11, wherein the holder portion is pivotally moved about the engaging projection.

* * * * *